Sept. 6, 1966 F. DEKKER 3,270,973

TAPE TRANSPORT MECHANISM FOR MULTIPLE TAPE WIDTHS

Filed April 21, 1964 5 Sheets-Sheet 1

INVENTOR:
Frank Dekker

By Smyth, Roston & Pavitt
Attorneys

Sept. 6, 1966 F. DEKKER 3,270,973

TAPE TRANSPORT MECHANISM FOR MULTIPLE TAPE WIDTHS

Filed April 21, 1964 5 Sheets-Sheet 2

INVENTOR:
Frank Dekker

By Smyth, Roston & Pavitt
Attorneys

INVENTOR:
Frank Dekker
By Smyth, Roston & Pavitt
Attorneys

TAPE TRANSPORT MECHANISM FOR MULTIPLE TAPE WIDTHS

Filed April 21, 1964

INVENTOR:
Frank Dekker
By Smyth, Roston & Pavitt
Attorneys

Sept. 6, 1966 F. DEKKER 3,270,973

TAPE TRANSPORT MECHANISM FOR MULTIPLE TAPE WIDTHS

Filed April 21, 1964

5 Sheets-Sheet 5

INVENTOR:
Frank Dekker

By Smyth, Roston & Pavitt
Attorneys

United States Patent Office 3,270,973
Patented Sept. 6, 1966

3,270,973
TAPE TRANSPORT MECHANISM FOR MULTIPLE TAPE WIDTHS

Frank Dekker, Inglewood, Calif., assignor to Minnesota Mining and Manufacturing Company, St. Paul, Minn., a corporation of Delaware Filed Apr. 21, 1964, Ser. No. 361,478
17 Claims. (Cl. 242—55.12)

This invention relates to a tape transport system of the type which comprises two hub means for mounting a supply reel and a take-up reel, respectively, a capstan assembly to drive the tape and form a portion of the traveling tape into a tensioned loop, and various tape guides to route the tape from the supply reel to the capstan assembly and from the capstan assembly to the take-up reel. The invention is directed to the problem of constructing such a tape transport system for quick and convenient conversion whenever required from handling a tape of one width to handling a tape of a different width.

For the purpose of disclosure, the present invention is directed specifically to the problem of adapting such a system for handling two tapes of ½" width and 1" width, interchangeably, with rapid change-over from one tape to the other. It is to be understood, however, that the invention is not limited to specific tape sizes.

With reference to the problem of mounting of the two sizes of tape reels interchangeably, consideration must be given to the fact that the reels are of different axial dimensions. The difficulty is that consideration must also be given to the further fact that a conventional plastic reel for ½" tape has an axial centering opening of not more than ⅜" diameter whereas a conventional reel for 1" tape has an axial centering opening of approximately 3" in diameter. It is apparent that mounting structures of two different configurations and two different dimensions must be provided to support and center the two different reels. It is also essential that the tapes of the different widths all travel with one edge of the tape in a given plane.

With reference to the capstan assembly: the ingoing leg of the tensioned loop of tape travels from a drive capstan to a return capstan; the outgoing leg travels back from the return capstan to the drive capstan; one nip roller cooperates with at least one portion of one diameter of the drive capstan to drive the ingoing tape; and a second nip roller cooperates with at least one portion of a larger diameter of the drive capstan to drive the outgoing leg of the loop at a higher speed to keep the tape under tension.

With reference to the tape guides, at least some of them must confine the traveling tape laterally for accurate tracking of the tape. For this purpose such confining tape guides are formed with spaced opposed shoulders for sliding engagement with the opposite edges of the traveling tape.

In a conventional tape transport system of this type, two interchangeable sets of components are required for the two different tape widths and the change-over from one tape size to the other tape size requires complete replacement of several components. One hub structure is substituted for another hub structure in changing over from one reel size to the other reel size and where tape guides are used of the type that confine the traveling tape, one tape guide is substituted for another when a tape of one width is substituted for a tape of the other width. In the capstan assembly, the change-over requires replacement of the drive capstan together with the two associated nip rollers and the change-over task is complicated by the fact that, for good reasons, the motor for actuating the drive capstan is united with the drive capstan and the whole capstan unit must be replaced.

It can be appreciated that the change-over from one tape size to the other requires considerable time and the services of a skilled technician. It is also to be noted that further time may be lost and a change-over may be completely defeated if one component of a set of components is misplaced.

The present invention meets this situation by providing a single set of tape handling components in which the components are universal components in the sense that each component of the set is capable of handling a tape of either of the two widths. Only one such set of components is used and no time loss is required for removing and installing any of the components.

The invention provides universal hub structures, each of which is capable of handling either of the two sizes of reels. The problem of providing a hub structure of a configuration to cooperate with either of the two reel sizes and at the time to place the inner edges of the two tapes in the same plane is solved by employing a hub structure of stepped configuration and by further providing for axial shift of the hub structure between two different operating positions for the two tapes.

In a conventional capstan assembly, the drive capstan has three successive circumferential zones, the middle zone being of one diameter and the two outer zones being of a slightly different diameter, one nip roller pressing the tape against at least one circumferential zone of the smaller diameter to drive the incoming tape, the other nip roller pressing the tape against at least one circumferential zone of the larger diameter to drive the outgoing tape. The problem of providing a universal capstan assembly is met by dimensioning the components for the widest of the two tapes and dividing the drive capstan and the associated nip roller into five zones of alternate diameter instead of three zones. All five of the zones are used for the wide tape and only three of the zones are used for the narrow tape.

The problem of providing a universal tape guide of the tape-confining type is solved by making at least a portion of a tape guide rotatable between two alternate rotary positions. At one of the two alternate positions the tape guide presents to the path of tape travel a pair of opposed shoulders spaced apart to confine the narrow tape and at the second rotary position the tape guide presents a pair of opposed shoulders spaced apart to confine the wide tape.

With the described universal transport system, the task of changing over from one tape size to another requires merely adjustment manipulation of the two hub structures and manipulation of the adjustable tape guides. Since the capstan assembly requires no manipulation whatsoever, a change from one tape size to the other may be accomplished with practically no lost time.

The features and advantages of the invention may be understood from the following detailed description and the accompanying drawings.

In the drawings, which are to be regarded as merely illustrative:

FIG. 1 shows somewhat diagrammatically a tape transport system which embodies the invention and which therefore may be aptly termed a universal system since it may be used interchangeably for running either a tape of ½" width or a tape of 1" width with no necessity for substitution of any components of the system in changing over from one tape size to the other.

Figure 1:
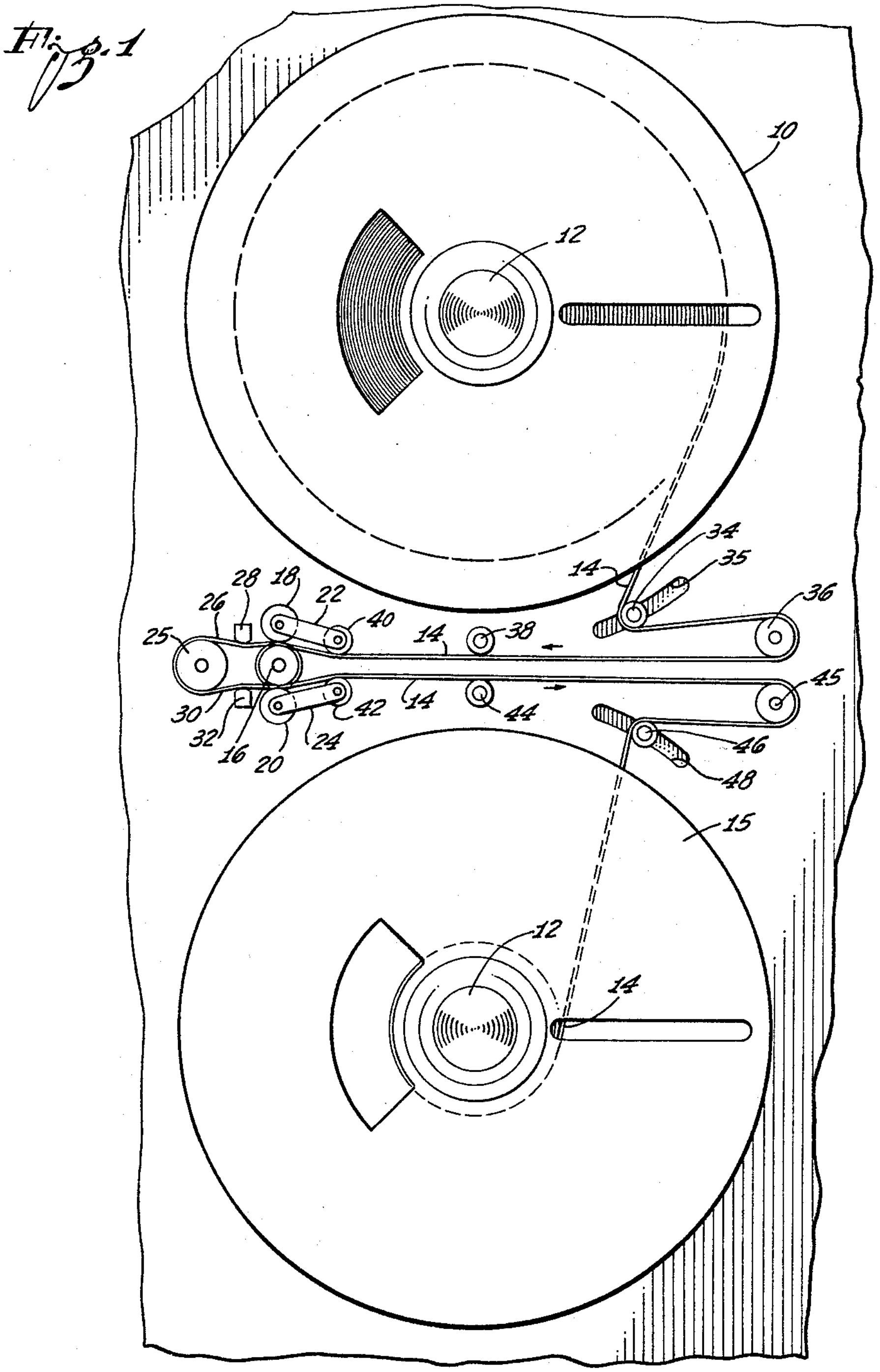
FIG. 1 is a simplified plan view of a selected embodiment of the universal tape transport system.

In FIG. 1, a supply reel 10 mounted on a universal hub assembly 12 supplies a tape 14 of either ½" width or 1" width which passes through a capstan assembly and is then wound onto a takeup reel 15 that is mounted on a second universal hub assembly 12. The capstan assembly includes a differential drive capstan 16, two cooperating nip rollers 18 and 20 mounted on corresponding pivoted brackets 22 and 24, and a return capstan 25. In a well known manner the capstan assembly forms the traveling tape into a tensioned loop having an ingoing leg 26 in contact with a transducer 28 and having an outgoing leg 30 in contact with a second transducer 32.

Suitable tape guides are required to route tape from the supply reel 10 to the capstan assembly and from the capstan assembly to the takeup reel 15. In the construction shown in FIG. 1 the tape guides for routing the tape from the supply reel 10 to the capstan assembly include a spring-loaded tape guide 34 that is movable along an arcuate slot 35, a rotary tape guide 36, a confining tape guide 38 and a second confining tape guide 40, the second confining tape guide being mounted on the pivot axis of the bracket 22. The tape guides for routing the tape from the capstan assembly to the takeup reel 15 include a confiing tape guide 42 similar to the confining tape guide 40, a confining tape guide 44 similar to the confining tape guide 38, a rotary tape guide 45, and a tape guide 46 that is movable along an arcuate slot 48.

The tape guides 34, 36, 45 and 46 are universal guides since they are of simple uniform cylindrical configuration and being wide enough to handle 1" tape are wide enough to handle ½" tape. The confining tape guides 38, 40, 42 and 44 are universal with respect to ½" and 1" tapes because, as will be explained, each of these is rotatably adjustable between two positions to confine the two tapes respectively.

Figure 5:
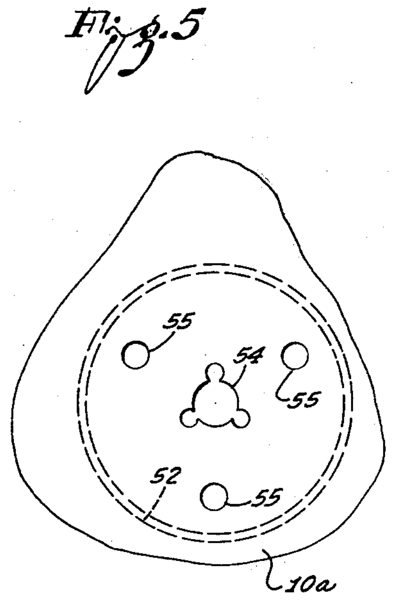
FIG. 5 is a plan view of a conventional plastic reel for handling magnetic recording tape of ½" width.
Figure 7:
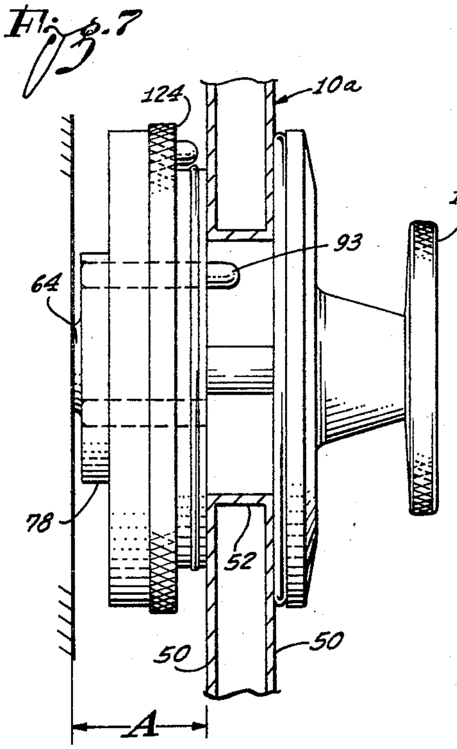
FIG. 7 is a view partially in section which shows the hub assembly carrying a relatively narrow plastic reel.

FIGS. 5 and 7 indicate the structure of a conventional plastic reel, generally designated 55 for handling ½" tape. The reel has two spaced side plates 50 interconnected by a cylindrical wall 52 on which the tape is wound. Each of the two side plates 50 is provided with an axial opening 54 and three circumferentially spaced apertures 55, any one of which may be engaged for the purpose of driving the reel.

Figure 6:
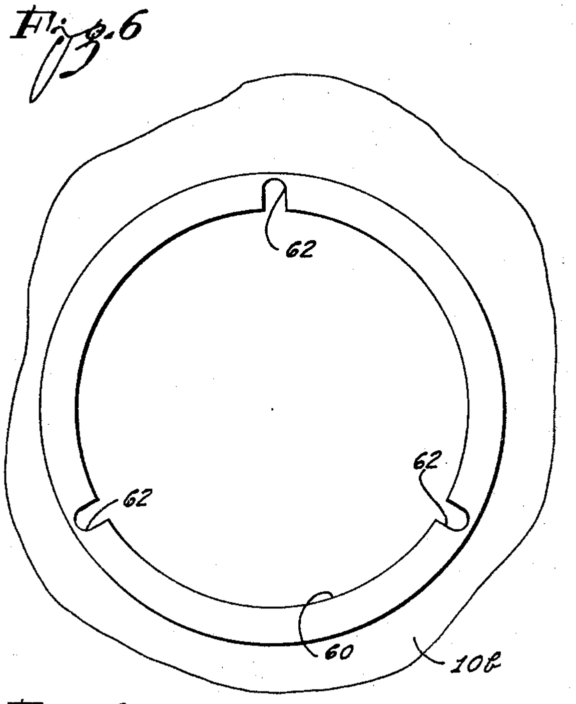
FIG. 6 is a fragmentary plan view of a reel for handling 1" tape.
Figure 8:
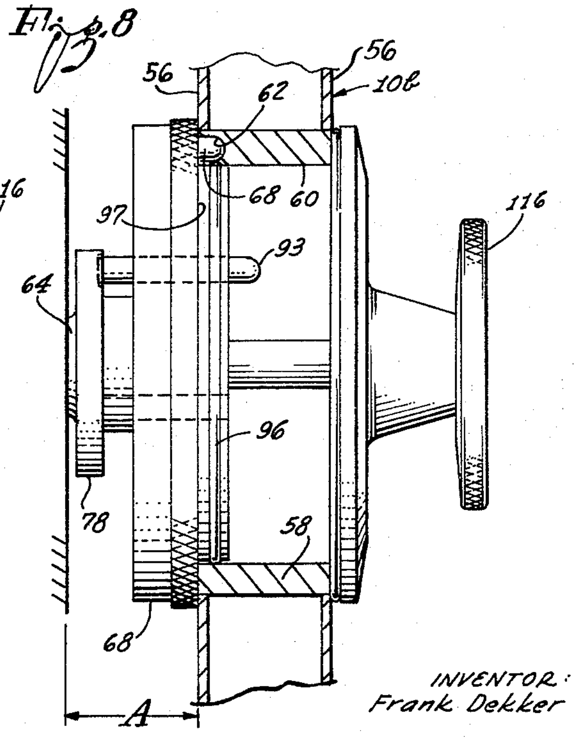
FIG. 8 is a similar view showing how the same hub structure carries a wider reel.

FIGS. 6 and 8 indicate the construction of a conventional reel, generally designated **10*b*, that is commonly used for 1" tape. The reel 10*b* has two opposite side plates 56 interconnected by a cylindrical wall 58 on which which the tape is wound. Each of the two side plates 56 is formed with a relatively large axial opening 60 and the rim of each of the axial openings is further formed with three circumferentially spaced semicircular recesses 62** for engagement by means to drive the reel.

Figures 2, 3, 4:
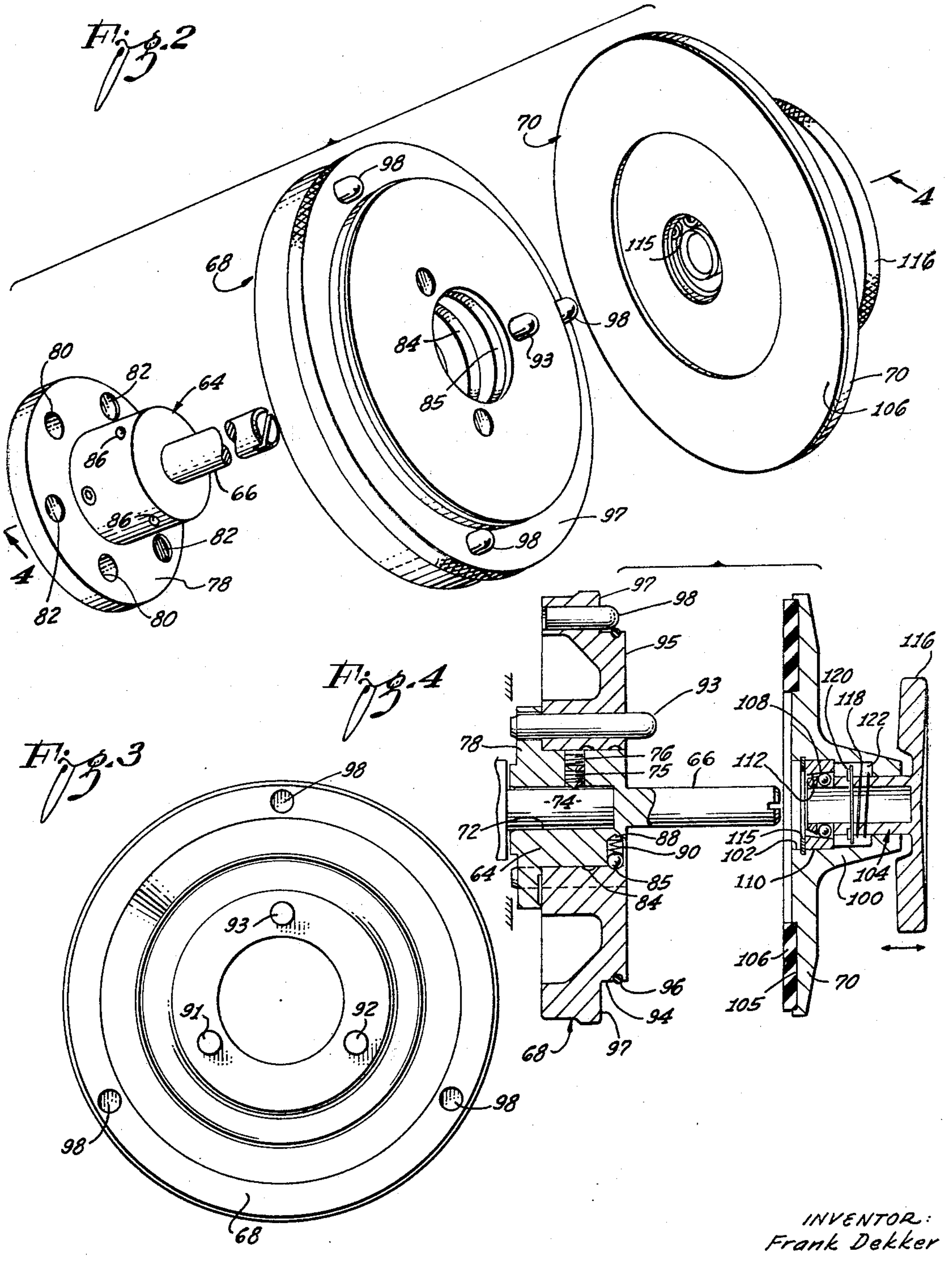
FIG. 2 is an exploded perspective view of a universal hub structure that is used for mounting the two sizes of reels interchangeably.
FIG. 3 is a face view of one of the members shown in FIG. 2.
FIG. 4 is a sectional view of the universal hub structure with the retainer means for the reel slightly separated from the rest of the structure.

Each of the two universal hub assemblies 12 shown in FIG. 1 may be of the construction shown in FIGS. 2, 3, 4, 7 and 8. As indicated in FIGS. 2 and 4, a universal hub structure 12 comprises three separate members, namely a central base member 64 formed with an axial spindle 66 that is dimensioned to fit the axial opening 54 of a reel **10*a*, a concentric hub member 68 slidably mounted on the base member, and a retainer 70 which is slidable on the axial spindle 66**.

The base member 64 has a blind axial bore 72 to permit the hub assembly to be mounted on the spindle 74 of a conventional rotary reel support, the base member being retained on the spindle by a radial set screw 75 backed by a second set screw 76. The base member 64 is formed with a circular radial flange 78 which, as shown in FIGS. 2 and 4, is provided with three circumferentially spaced shallow circular recesses 82, the bores and recesses being in alternate positions around the circumference of the flange.

It is contemplated that the hub member 68 will be slidable axially on the base member 64 between an inner position abutting the radial flange 78 of the base member as shown in FIG. 7 and a second outer position shown in FIG. 8 where the hub member is axially spaced from the radial flange. Suitable detent means is provided to yieldingly retain the hub member at either of these two relative positions. For this purpose the inner circumference of the hub member 68 may be formed with a pair of circumferential grooves 84 and 85, as shown in FIGS. 2 and 4 and the base member 64 may be provided with a circumferential set of three detent balls 86 (FIGS. 2 and 4) for engagement with the two grooves selectively. Each of the detent balls 86 is mounted in a corresponding radial bore 88 and is backed by a corresponding coil spring 90.

The hub member 68 carries an inner set of circumferentially spaced pins 91, 92 and 93, all of which protrude from the inner face of the hub member towards the base member 64. The other ends of the pins 91 and 92 are substantially flush with the outer face of the hub member 68 but the third pin 93 is long enough to protrude beyond the outer face as indicated in FIGS. 4, 7 and 8.

When the hub member 68 is in its inner position abutting the radial flange 78 of the base member 64 as shown in FIG. 7 the protruding inner ends of the three pins 91, 92 and 93 extend into the three previously mentioned bores 80 in the radial flange 78. When the hub member 68 is shifted axially to its second outer position shown in FIG. 8 the hub member is rotated sufficiently to permit the protruding inner ends of the pins 91, 92 and 93 to seat in the three corresponding circular recesses 82.

As best shown in FIG. 4 the hub member 68 is formed with a relatively large boss 94 having a flat end face 95. The boss 94 is dimensioned to fit into the circular aperture 60 of a reel **10*b* and the boss is provided with an O-ring 96 for snug fit with the reel. The boss 94 is surrounded by a circumferential shoulder 97 to seat the reel 10*b* and an outer set of three circumferentially spaced pins protrude from the radial shoulder to serve as lugs to engage the corresponding recesses 62** of the reel for interlocking the reel with the hub structure.

The retainer 70 comprises a disk formed with an axial boss 100 and an axial bore 102 in which bore a tubular control member 104 is slidingly mounted. The retainer 70 is formed with a wide concentric groove 105 on its inner face in which is mounted a flat elastomeric ring 106 for exerting pressure against a mounted reel. The purpose of the control member 104 is to release what may be termed one-way clutch means which grips the spindle 66 to prevent retraction of the retainer when the retainer is forced along the spindle into pressure engagement with a reel.

As shown in FIG. 4, the releasable clutch means comprises a set of circumferentially spaced clutch elements in the form of steel balls 108 and a surrounding cooperating cam ring 110, the inner circumference of which forms a tapered circular cam surface 112. The clutch balls 108 are mounted in corresponding radial apertures in the tubular control member and the cam ring 112 is confined between an inner circumferential shoulder of the boss and a snap ring 115. The tubular control member 104 is formed with a handle 116 and is normally urged radially inwardly by a coil spring 118 that is under compression between a snap ring 120 on the tubular control member and an inner circumferential shoulder 122 that is formed in the axial bore 102.

Under the pressure of the coil spring 118 the steel balls 108 are normally wedged against the periphery of the spindle 66 whereby the retainer 70 firmly clamps a reel against the hub member 68. When the hub structure 70 is axially retracted by manipulation of the handle 116 the steel balls 108 are relaxed to permit the retainer to be readily withdrawn from the spindle 66.

When a ½" reel **10*a* is mounted on the hub assembly as shown in FIG. 7, the inner face of the reel lies against the flat end face 95 of the boss 94 with the spindle 66 extending through the axial opening 54 of the reel to center the reel. Relative rotation between the reel 10*a* and the hub assembly is prevented by the pin 93 engaging one of the three apertures 55** of the reel.

After the reel **10*a* is initially mounted on the spindle 66 in engagement with the pin 93, the retainer 70 is held by the handle 116 and is slipped onto the spindle 66 into pressure abutment against the reel. The retainer 70 slides freely along the spindle 66 because the axial force applied against the tubular control member 105 loosens the clutch balls 108. As soon as manual pressure on the handle 116 is terminated, however, the spring 118 becomes effective to urge the tubular control member inward to wedge the steel balls 108 against the spindle 66** to maintain the retainer in its position of pressure abutment against the reel.

To release the reel for removal, it is merely necessary to pull outward on the handle 116 to retract the tubular control member 104 against the resistance of the coil spring 118. Thus the outward manual pull on the handle 116 not only releases the clutch engagement with the spindle 66 but also withdraws the retainer from the spindle.

FIG. 8 shows how a 1" reel **10*b* is mounted on the hub assembly. The 1" reel 10*b* rests on the circumferential shoulder 97 of the hub member 68 that surrounds the base of the boss 94, the reel snugly embracing the O-ring 96. Relative rotation between the 1" reel 10*b* and the hub assembly is prevented by engagement of the three pins 98 with the three inner circumferential recesses 62 of the reel. The retainer 70 functions in the previously described manner to clamp the 1" reel 10*b* under pressure against the circumferential shoulder 97 of the hub member 68**.

Figure 9:
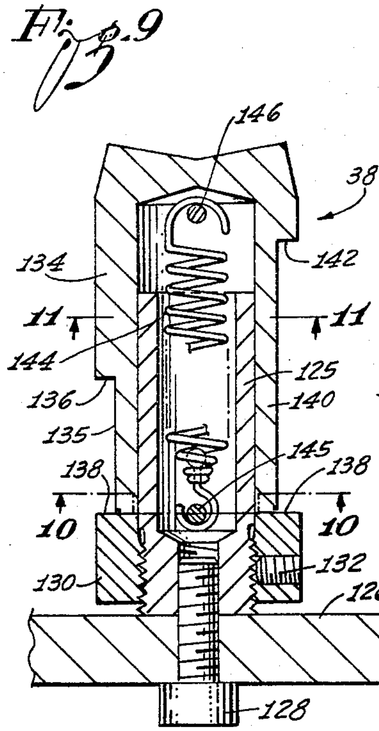
FIG. 9 is a longitudinal cross section of one of the universal tape guides.
Figure 11:
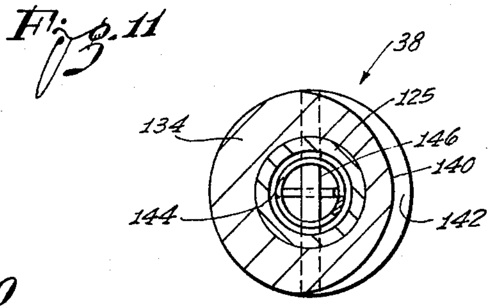
FIG. 11 is a transverse section along the line 11—11 of FIG. 9.
Figure 10:
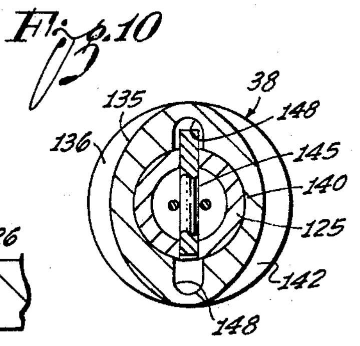
FIG. 10 is a transverse section along the line 10—10 of FIG. 9.

Each of the two universal guides 38 and 44 for confining the traveling tape by its opposite longitudinal edges may be of the construction of the tape guide 38 that is illustrated by FIGS. 9, 10 and 11. The tape guide 38 includes an inner tube 125 that is fixedly mounted on a base plate 126, the inner tube being anchored by a cap screw 128. The base portion of the inner tube 125 is formed with a screw thread for engagement by a surrounding adjustment nut 130 which is normally immobilized by a set screw 132.

Rotatably and slidably mounted on the inner tube 125 is an outer guide sleeve 134 which is formed with two guide surfaces on opposite sides of its circumference. One of the guide surfaces 135 is bounded by two shoulders to confine the opposite longitudinal edges of a traveling ½" tape, one shoulder 136 being formed in the guide sleeve and the opposite shoulder 138 being formed by the nut 130. A second opposite guide surface 140 for 1" tape is also bounded by two shoulders to confine the tape, one shoulder 142 being formed by the guide sleeve 143, the other shoulder 138 being formed by the nut 130.

A coil spring 144 acts under tension between a cross pin 145 in the inner fixed tube 125 and a second cross pin 146 in the guide sleeve 134, the effect of the spring being to urge the guide sleeve into abutment with the nut 130. As indicated in FIG. 10, the inner circumference of the guide sleeve 134 is formed with two diametrically opposed recesses 148 at its inner end and at least one end of the lower cross pin 145 extends radially beyond the circumference of the inner tube 125 as shown in FIG. 10 to cooperate with the two recesses. Thus the pin 145 releasably engages the guide sleeve 134 to immobilize the guide sleeve selectively at two rotary positions 180° apart, the narrow guide surface 135 being presented to the traveling tape at one of the two positions of the guide sleeve and the wider guide surface 140 being presented to the traveling tape at the other position of the guide sleeve. It is a simple matter for an operator to retract the guide sleeve 134 manually out of engagement with the cross pin 145 for the purpose of rotating the guide sleeve from one of its positions to the other.

Figure 12:
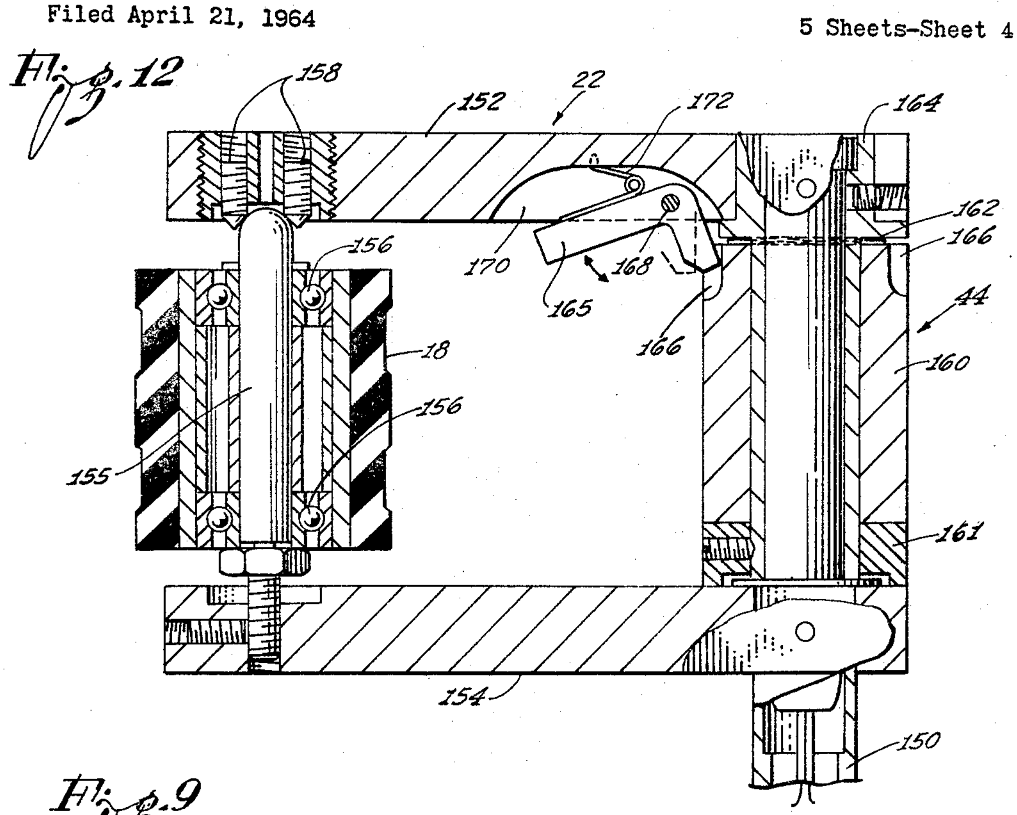
FIG. 12 is a sectional view of a bracket and a nip roller carried thereby, the nip roller being the nip roller that cooperates with the drive capstan to drive the ingoing tape.

The previously mentioned bracket 22 and the corresponding confining tape guide 44 may be of the construction shown in FIG. 12. The bracket 22 comprises a suitably controlled tubular shaft 150 on which a pair of parallel arms 152 and 154 are rigidly mounted. The lower arm 154 carries a spindle 155 on which the corresponding nip roller 18 is mounted by suitable bearings 156 for cooperation with the drive capstan 16 for controlling the ingoing leg 26 of the traveling tape. The upper end of the spindle 155 is confined and abutted by a plurality of circumferentially spaced set screws 158 in the upper bracket arm 152.

A guide sleeve 160 is rotatably mounted on the tubular shaft 150 between the two radial arms 152 and 154 in abutment against a collar 161 and is yieldingly held against rotation by a wafer spring washer 162. In the construction shown, the wafer spring washer 162 is confined between the upper end of the guide sleeve 160 and an enlargement 164 of the tubular shaft 150.

The guide sleeve 160 is of the same configuration as the previously described guide sleeve 140 and in like manner is rotatable 180° between a first position for guiding the relatively wide tape and a second position for guiding the relatively narrow tape.

In the construction shown, a manually operable latch 165 is adapted to releasably engage two diametrically opposite peripheral recesses 166 in the guide sleeve 160 for selectively and releasably holding the guide sleeve at its two alternate effective positions. The latch member 165 may be of angular configuration as shown and may be mounted on a pivot pin 168 to oscillate in a slot 170 of the upper arm under the pressure of a suitable spring 172. It is a simple matter for an operator to release the latch member 165 temporarily against the resistance of the spring 172 for the purpose of manually rotating the guide sleeve 160 between its two alternate effective positions.

The other bracket 20 is of the same construction as the described bracket 22 but carries the second nip roller 20 for cooperation with the drive capstan in controlling the outgoing leg of the tensioned loop of the traveling tape.

Figure 13:
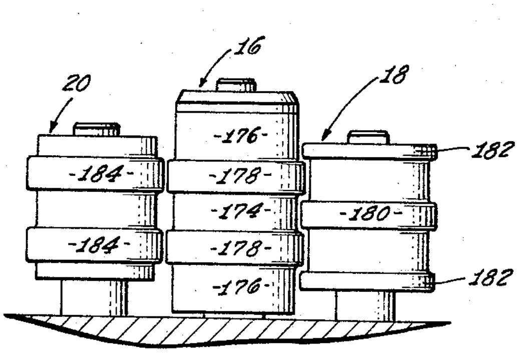
FIG. 13 is an elevational view showing the drive capstan and the two cooperating nip rollers in the preferred practice of the invention.
Figure 14:
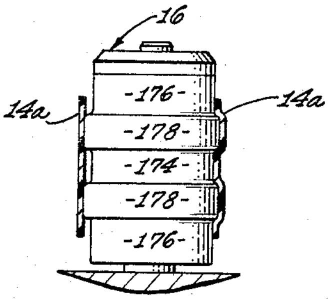
FIG. 14 is an elevation, partly in section which shows how the universal drive capstan makes contact with the wider of the two tapes.
Figure 15:
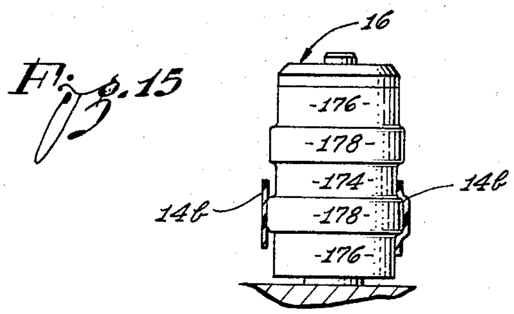
FIG. 15 is a similar view showing how the universal drive capstan makes contact with the narrower of the two tapes.

Turning now to the capstan assembly, the differential capstan 16 shown in FIGS. 13–15 has a central circumferential driving zone 174 of a given diameter, two end circumferential driving zones 176 of the same diameter and two intermediate circumferential driving zones 178 of a slightly larger diameter. The nip roller 18 is cut away to clear the two intermediate circumferential driving zones 178 of the drive capstan 16 and is formed with a central circumferential enlargement 180 to cooperate with the central circumferential driving zone 174 and is further formed with two circumferential end enlargements 182 to cooperate with the two end circumferential driving zones 176 of the drive capstan. The second nip roller 20 may be of uniform diameter but in the construction shown has two circumferential enlargements 184 which cooperate respectively with the two intermediate circumferential driving zones 178 of the drive capstan.

FIG. 14 shows the manner in which the wider tape 14*a*, of the two tapes makes contact with the differential drive capstan 16 under the pressure of the two cooperating nip rollers 18 and 20. The first nip roller 18 effectively presses the tape against the drive capstan 16 only in the regions of the central zone 174 and the two end zones 176 to drive the ingoing leg of the tensioned loop at the desired velocity. On the other hand, the second nip roller 20 presses the traveling tape 14*a* against only the two intermediate circumferential driving zones 178 to drive the outgoing leg of the tape at a somewhat higher speed for the purpose of placing the loop of tape under tension.

FIG. 15 shows how a tape 14*a* of half the width of the tape 14*a* is pressed against the drive capstan 16 by the two nip rollers 18 and 20. It is to be noted that the tape 14*a* is positioned symmetrically relative to the lower intermediate circumferential driving zone 178 of the drive capstan, a central longitudinal portion of approximately half the width of the tape 14*a* being coextensive with the lower intermediate circumferential driving zone 178 of the capstan and two opposite longitudinal marginal portions of the tape of a total width of approximately half of the width of the tape lying against the central circumferential driving zone 174 and against the end circumferential driving zone 176, respectively.

It is apparent that the described capstan assembly functions with the narrow tape 14*a* as well as with the wider tape 14*b* and thus makes it unnecessary to substitute one drive capstan and two cooperative nip rollers for another drive capstan and two cooperative nip rollers when a change-over is made from the wider tape to the narrower tape or from the narrower tape to the wider tape. It is to be noted that the lower edge of the narrower tape 14*b* in FIG. 15 is in the same plane as the lower edge of the wider tape 14*a* in FIG. 14.

The manner in which the universal tape transport system functions for its purpose may be readily appreciated from the foregoing description. When it is desired to make a change-over from one of the two tape sizes to the other, the two universal assemblies 12 are manipulated in the manner heretofore described for the purpose of mounting two reels for running the tape of the new width. The two tape guides 38 and 44 are changed over by simply manually retracting their guide sleeves 134 out of engagement with the corresponding pins 145 and then the guide sleeves are rotated 180° to be again engaged by the cross pin 145. For the same purpose, the two guide sleeves 160 carried by the two brackets 20 and 22 are rotated 180° after first manually retracting each of the two latches 165. It is not necessary to make any adjustments of the spring-loaded tape guides 34 and 46 because they are uniform in diameter and for the same reasons it is not necessary to make any adjustments of the two rotary tape guides 36 and 45.

In the capstan assembly it is not necessary to touch the return capstan 25 because it also is of uniform diameter so that it can cooperate with tapes of both widths. As heretofore explained, it is not necessary to make any adjustments or substitutions whatsoever with respect to the drive capstan 16 and the two associated nip rollers 18 and 20 since, these cooperating components have the inherent capability of driving tapes of both sizes.

My description in specific detail of the selected embodiment of the invention will suggest various changes, substitutions and other departures from my disclosure within the spirit and scope of the appended claims.

I claim:

1. In a tape transport system for quick conversion from handling a relatively narrow tape on a pair of relatively thin reels to handling a relatively wide tape on a pair of relatively thick reels, the combination of:

two hub assemblies to engage and mount the two pairs of reels interchangeably;

means including a drive capstan to engage and drive the narrow tape and the wide tape interchangeably; and a plurality of guide means located and shaped to guide the tapes from one of the reels to the drive capstan and from the drive capstan to the other reel, at least a portion of each of at least some of the guide means being rotatable between one operating position presenting a pair of shoulders spaced apart for slidingly confining the opposite longitudinal edges of the narrow tape and a second operating position presenting a pair of shoulders spaced apart for slidingly confining the opposite longitudinal edges of the wide tape.

2. In a tape transport system for quick conversion from handling a relatively narrow tape on a pair of relatively thin reels to handling a relatively wide tape on a pair of relatively thick reels, the combination of:

two hub assemblies to engage and mount the two pairs of reels interchangeably;

means including a drive capstan to engage and drive the narrow tape and the wide tape interchangeably; and a plurality of guide means located and shaped to guide the tapes from one of the reels to the drive capstan and from the drive capstan to the other reel, some of the guide means having guide surfaces of uniform cross section to guide the tapes of the two widths interchangeably without adjustment, at least a portion of each of the remaining guide means being rotatable between one operating position presenting a pair of shoulders spaced apart for slidingly confining the opposite longitudinal edges of the narrow tape and a second operating position presenting a pair of shoulders spaced apart for slidingly confining the opposite longitudinal edges of the wide tape.

3. In a tape transport system for quick conversion from handling a relatively narrow tape on a pair of relatively thin reels to handling a relatively wide tape on a pair of relatively thick reels, the combination of:

two hub assemblies each including a hub member with an axial spindle and a retainer mounted on the spindle with the retainer adjustable relative to the hub member to cooperate with the hub member to clamp a thin reel and a thick reel interchangeably;

means including a drive capstan and at least one cooperating nip roller to engage and drive the narrow tape and the wide tape interchangeably; and a plurality of guide means to engage the narrow tape and the wide tape interchangeably, a portion of each of at least some of the guide means being rotatable between one operating position presenting a pair of shoulders spaced apart for slidingly confining the opposite longitudinal edges of the narrow tape and a second operating position presenting a pair of shoulders spaced apart for slidingly confining the opposite longitudinal edges of the wide tape.

4. In a tape transport system for quick conversion from handling a relatively narrow tape on a pair of relatively thin reels to handling a relatively wide tape on a pair of relatively thick reels, the combination of:

two hub assemblies adapted to mount the two pairs of reels interchangeably, each hub assembly having a hub member, an axial spindle mounted on the hub member to extend through the thick and thin reels interchangeably, a retainer on the spindle to clamp thick and thin reels interchangeably against the hub member, means on the retainer normally engaging the spindle to resist withdrawal of the retainer from the spindle, and handle means on the retainer manually operable to release the engaging means for manual adjustment of the retainer axially of the spindle;

means including a drive capstan and at least one cooperating nip roller to engage and drive the narrow tape and the wide tape interchangeably; and a plurality of guide means to engage the narrow tape and the wide tape interchangeably, a portion of each of at least some of the guide means being rotatable between one operating position presenting a pair of shoulders spaced apart for slidingly confining the opposite longitudinal edges of the narrow tape and a second operating position presenting a pair of shoulders spaced apart for slidingly confining the opposite longitudinal edges of the wide tape.

5. In a tape transport system for quick conversion from handling a relatively narrow tape on a pair of relatively thin reels to handling a relatively wide tape on a pair of relatively thick reels, the combination of:

two hub assemblies adapted to mount the two pairs of reels interchangeably;

a capstan assembly including a differential drive capstan and two cooperating nip rollers of configurations complementary to the configuration of the drive capstan, the drive capstan having circumferential portions of a given diameter and adjacent circumferential portions of slightly less diameter, the portions of the two diameters alternating along the axial dimension of the capstan, there being two portions of one of the two diameters and three portions of the other diameter, the portions of the capstan being dimensioned for three successive portions to engage the relatively narrow tape and for all of the portions of the capstan to engage the wide tape whereby the differential capstan and the cooperating nip rollers may be used for the narrow tape and the wide tape interchangably; and a plurality of guide means to guide the tapes from one of the reels to the capstan assembly and from the capstan assembly to the other reel, some of the guide means having guide surfaces of uniform cross section to guide the tapes of the two widths interchangeably without adjustment, at least a portion of each of the remaining guide means being rotatable between one operating position presenting a pair of shoulders spaced apart for slidingly confining the opposite longitudinal edges of the narrow tape and a second operating position presenting a pair of shoulders spaced apart for slidingly confining the opposite longitudinal edges of the wide tape.

6. In a tape transport system for quick conversion from handling a relatively narrow tape on a pair of relatively thin reels to handling a relatively wide tape on a pair of relatively thick reels, the combination of:

two hub assemblies each including a hub member with an axial spindle and a retainer mounted on the spindle and adjustable relative to the hub member to fixedly engage a thin reel and a thick reel interchangeably;

a capstan assembly including a differential drive capstan and two cooperating nip rollers of configurations complementary to the configuration of the drive capstan, the drive capstan having circumferential portions of a given diameter and adjacent circumferential portions of slightly less diameter, the circumferential portions of the two diameters alternating along the axial dimension of the capstan, there being two circumferential portions of one of the two diameters and three circumferential portions of the other of the two diameters, the circumferential portions of the capstan being dimensioned for three successive portions to engage the narrow tape and for all of the portions to engage the wide tape; and a plurality of guide means to engage the narrow tape and the wide tape interchangeably, at least a portion of each of at least some of the guide means being rotatable between one releasably latched position presenting a pair of shoulders spaced apart for slidingly confining the opposite longitudinal edges of the narrow tape and a second alternate releasably latched position presenting a pair of shoulders spaced apart for slidingly confining the opposite longitudinal edges of the wide tape.

7. In a tape transport system for quick conversion from handling a relative narrow tape on a pair of relatively thin reels to handling a relatively wide tape on a pair of relatively thick reels, the combination of:

two hub assemblies adapted to hold the two pairs of reels interchangeably;

a capstan assembly to drive the narrow and wide tapes interchangeably including a differential drive capstan and two cooperating nip rollers;

a pair of brackets for the two nip rollers respectively, each bracket having an axial portion and at least one radial portion to support the corresponding nip roller, said brackets being rotatable to swing the nip rollers between effective positions and retracted positions relative to the drive capstan; and a plurality of guide means to guide the two tapes interchangeably between the capstan assembly and the two hub assemblies respectively, the plurality guide means including two guide means mounted on the axial portions of the two brackets, respectively, at least a portion of each of the two guide means being rotatable between one operating position presenting a pair of shoulders spaced apart for slidingly confining the opposite longitudinal edges of the narrow tape and a second operating position presenting a pair of shoulders spaced apart for slidingly confining the opposite longitudinal edges of the wide tape.

8. A combination as set forth in claim 6 which includes latch means on each of the two brackets to releasably hold the corresponding one of the two guide means at its two rotary positions selectively.

9. A rotary hub assembly for mounting selectively a first reel having a relatively small axial opening and a second reel having a relatively large axial opening, comprising:

a hub structure having a boss to fit into the large axial opening of the second reel to center the second reel with radial shoulder means at the base of the hub portion to abut and support the larger reel, the boss having a transverse end face to abut and support the first reel;

a spindle dimensioned to fit into the small axial opening of the first reel to center the first reel and extending axially from the end face of the boss;

retainer means of larger diameter than the boss removably mounted on the spindle and adjustable axially of the spindle to clamp the two reels interchangeably against the hub structure;

a rotary support; and means to retain the hub structure on the support structure selectively at either a first position to support the first reel contiguous to a given plane or at a second position axially spaced from the first position to retain the second reel contiguous to the same plane.

10. A combination as set forth in claim 9 which includes means projecting from the end face of the boss to hold the first reel against rotation relative to the hub structure and means projecting from the shoulder means to hold the second reel against rotation relative to the hub structure.

11. A combination as set forth in claim 9 which includes:

means projecting from one of the hub structure and the rotary support positioned concentrically thereof; and recess means on the other of the hub structure and rotary support, whereby at one rotary position of the hub structure relative to the rotary support, the projecting means enters the recess means to place the hub structure at its first position and at another relative rotary position of the hub structure with the projecting means out of register with the recess means, the projecting means places the hub structure at its second position.

12. A rotary hub assembly for mounting interchangeably a first reel carrying a relatively narrow tape and having a relatively small axial opening and a second reel carrying a relatively wide tape and having a relatively large axial opening, comprising:

a hub structure having a concentric boss with a radial shoulder at the base of the boss and with a spindle extending axially from the surface of the boss, the hub structure being dimensioned for the boss to support the first reel with the spindle portion engaging the axial opening thereof to center the reel and for the radial shoulder to support the second reel with the boss engaging the axial opening of the second reel to center the second reel;

means cooperative with the spindle and adjustable to clamp the two reels on the hub structure interchangeably; and means to adjust the hub structure axially to place the inner edge of either tape in a given plane.

13. A combination as set forth in claim 12 which includes a rotary support to carry the hub structure together with means to shift the hub structure axially between two positions relative to the rotary support.

14. A combination as set forth in claim 13 which includes detent means operative between the hub structure and the rotary support to yieldingly hold the hub structure at the two positions.

15. A rotary hub assembly for mounting interchangeably a first reel carrying a relatively narrow tape and having a relatively small axial opening and a second reel carrying a relatively wide tape and having a relatively large axial opening, comprising:

a hub structure having a concentric boss with a radial shoulder at the base of the boss and with a spindle extending axially from the surface of the boss, the hub structure being dimensioned for the boss to support the first reel with the spindle engaging the axial opening thereof to center the reel and for the radial shoulder to support the second reel to center the second reel;

retainer means slidably mounted on the spindle to clamp either of the two reels against the hub structure;

one-way clutch means operative between the retainer means and the spindle to permit movement the retainer means towards the hub structure but to prevent the opposite movement whereby the retainer means may be forced along the spindle against one of the reels and will remain at whatever position to which it is forced, said clutch means being manually releasable to permit retraction of the retainer means; and means to adjust the hub structure axially between a position placing the inner edge of the narrow tape in a given plane and a second position placing the inner edge of the wide tape in the same plane.

16. A combination as set forth in claim 14 in which said one-way clutch means comprises:

a circumferential assembly of clutch elements;

cam means to force the assembly of clutch elements into effective engagement with the spindle, one of the assembly and the cam means being axially movable into an effective position relative to the other of the assembly and the cam means;

said one of the assembly and the cam means being also manually retractable from the effective position; and spring means urging said one of the assembly and the cam means towards its effective position.

17. A combination as set forth in claim 16 in which said one-way clutch comprises:

annular cam means surrounding the spindle and carried by the retainer means, the annular cam means being progressively reduced in inside diameter in the direction towards the hub structure;

a sleeve slidably mounted on the spindle inside the retainer means with the outer end of the sleeve accessible for manual retraction, said sleeve having a circumferential arrangement of apertures;

circular clutch elements in said apertures for movement by the sleeve into and out of effective engagement with the spindle; and spring means acting between the sleeve and the retainer means to normally yieldingly maintain the clutch elements at their positions of effective engagement.

References Cited by the Examiner

UNITED STATES PATENTS

| | | | |
|---|---|---|---|
| 2,950,072 | 8/1960 | Hayushida et al. | 242—76 |
| 2,988,294 | 6/1961 | Neff | 242—55.12 |
| 3,140,061 | 7/1964 | Benson | 242—68.1 |

FRANK J. COHEN, *Primary Examiner.*

LEONARD D. CHRISTIAN, *Examiner.*